United States Patent [19]
Hashigaya

[11] Patent Number: 6,059,436
[45] Date of Patent: May 9, 2000

[54] VEHICLE LAMP

[75] Inventor: Kazuya Hashigaya, Shizuoka, Japan

[73] Assignee: Koito Manufacturing Co., Ltd., Tokyo, Japan

[21] Appl. No.: 09/113,342

[22] Filed: Jul. 10, 1998

[30] Foreign Application Priority Data

Jul. 10, 1997 [JP] Japan ..................................... 9-202540

[51] Int. Cl.[7] ................................. F21V 5/00; F21V 7/00
[52] U.S. Cl. .......................... 362/544; 362/331; 362/242; 362/308
[58] Field of Search .................................. 362/544, 521, 362/331, 243, 242, 245, 307, 308

[56] References Cited

U.S. PATENT DOCUMENTS

| | | | |
|---|---|---|---|
| 5,068,768 | 11/1991 | Kobayashi | 362/544 |
| 5,128,839 | 7/1992 | Kato | 362/544 |
| 5,353,204 | 10/1994 | Kawamura | 362/544 |
| 5,735,591 | 4/1998 | Ruckwied | 362/544 |

*Primary Examiner*—Cassandra Spyrou
*Assistant Examiner*—Fayez Assaf
*Attorney, Agent, or Firm*—Sughrue, Mion, Zinn, Macpeak & Seas, PLLC

[57] ABSTRACT

A vehicle lamp includes a lamp chamber formed by covering the front opening of a lamp body with an outer lens in order to mount a reflector carrying a bulb of a vehicle lamp as a primary vehicle lamp in the lamp chamber, and an extension disposed on the periphery of the opening of the reflector mounted in the lamp chamber. The extension is fixed to the lamp body or the outer lens, and the reflector of a vehicle lamp as an auxiliary vehicle lamp and an inner lens for covering the opening of the reflector therewith are fixed to the extension.

12 Claims, 5 Drawing Sheets

6,059,436

VEHICLE LAMP

BACKGROUND OF THE INVENTION

1. Field of the Invention

The present invention relates to a vehicle amp capable of fixedly mounting, by a simple means, an inner lens and a reflector onto an extension disposed in a lamp body.

2. Related Art

With recent improvement in the art of distributing light by means of a reflector, there has been often employed a so-called see-through lens, without a lens step as shown in FIG. 6, formed on the surface of an outer lens 51 for covering the front opening of a lamp body. A vehicle lamp of this type is formed through the steps of forming a lamp chamber 52 by capping the front opening of a lamp body 50 with the outer lens 51, mounting a movable reflector 53 having a concave mirror surface for use in forming a predetermined light distribution pattern in the lamp chamber 52, supporting a bulb 54 at the focal point F, and providing a shade 55 for obtaining predetermined light distribution in the proximity of the front part of the bulb 54. Moreover, an inner lens 56 is juxtaposed with the front of the bulb 54, and an extension 57 is mounted on the inner periphery of the opening portion of the lamp body 50 in order to not only improve the design property of the interior of the lamp chamber 52 but also secure the depth of the space of the vehicle lamp.

As positions where the inner lens 56, the extension 57, the outer lens 51 and the like are mounted in the opening portion of the lamp body 50 are different from one another, however, these component parts are fixedly and separately fitted in a mounting groove 50b formed in the front opening 50a of the lamp body 50, for example. Consequently, these parts stick out in the outer peripheral direction (of an arrow X) of the front opening 50a of the lamp body 50 in the respective positions and this makes the external size of the vehicle lamp greater than the actual size of the lamp itself; the problem is that it tends to become difficult to mount these parts therein and to combine one vehicle lamp with any other vehicle lamp.

SUMMARY OF THE INVENTION

In view of the foregoing drawback accompanying the conventional vehicle lamp, it is an object of the present invention to provide a vehicle lamp capable of eliminating the mounting portion extending along the outer periphery of the front opening of the reflector to improve the external appearance even in a case where a reflector together with an inner lens is mounted on an extension, and a mounting portion where the reflector together with the inner lens is mounted on a lamp body.

Another object of the invention is to provide a vehicle lamp which can be extremely easily mounted on the lamp body.

The above and other objects can be achieved by a provision of a vehicle lamp which, according to the present invention, includes a lamp chamber formed by covering the front opening of a lamp body with an outer lens, and an extension disposed on the periphery of the opening of a reflector mounted in the lamp chamber and the extension is fixed to a lamp body or the outer lens and the reflector and an inner lens for covering the opening of the reflector therewith are fixed to the extension.

The inner lens may fixedly be provided in the opening of the reflector and that the inner lens is fixed to the extension. Consequently, the reflector and the inner lens can be fixed simultaneously to the extension and their assembling work can be done simultaneously with the effect of not only simplifying the structure but also improving mounting work efficiency.

Mating holes are provided on one side of the mating portion among the extension, the inner lens and the reflector wherein mating projections are provided on the other side thereof and wherein by fitting the mating projections into the respective mating holes, each of the portions where the projections are fitted into the respective holes is fixed. A portion where the extension and the inner lens are mated and a portion where the inner lens and the reflector are mated are formed on substantially the same straight line when these portions are viewed from the front of the optical axis of a bulb. Consequently, the mating projections formed on the inner lens are fixedly fitted into the mating holes bored in the reflector, and the mating projections formed on the extension are fixedly fitted into the mating holes bored in the inner lens, whereby there is provided a structure in which the reflector, the inner lens and the extension are successively and mutually fixed in order that the reflector, the inner lens and the extension engage with each other with one touch. Thus, the vehicle lamp is extremely easily mounted on the lamp body and this provides excellent workability therefor.

A second inner lens may be installed in the rear portion of the first inner lens in such a manner that the second inner lens is clamped between the rear end edge of the first inner lens and the open edge of the reflector.

DESCRTPTION OF THE PREFERRED EMBODIMENTS

A description of a preferred embodiment will now be described in detail with reference to the accompanying drawings.

Figure 1:
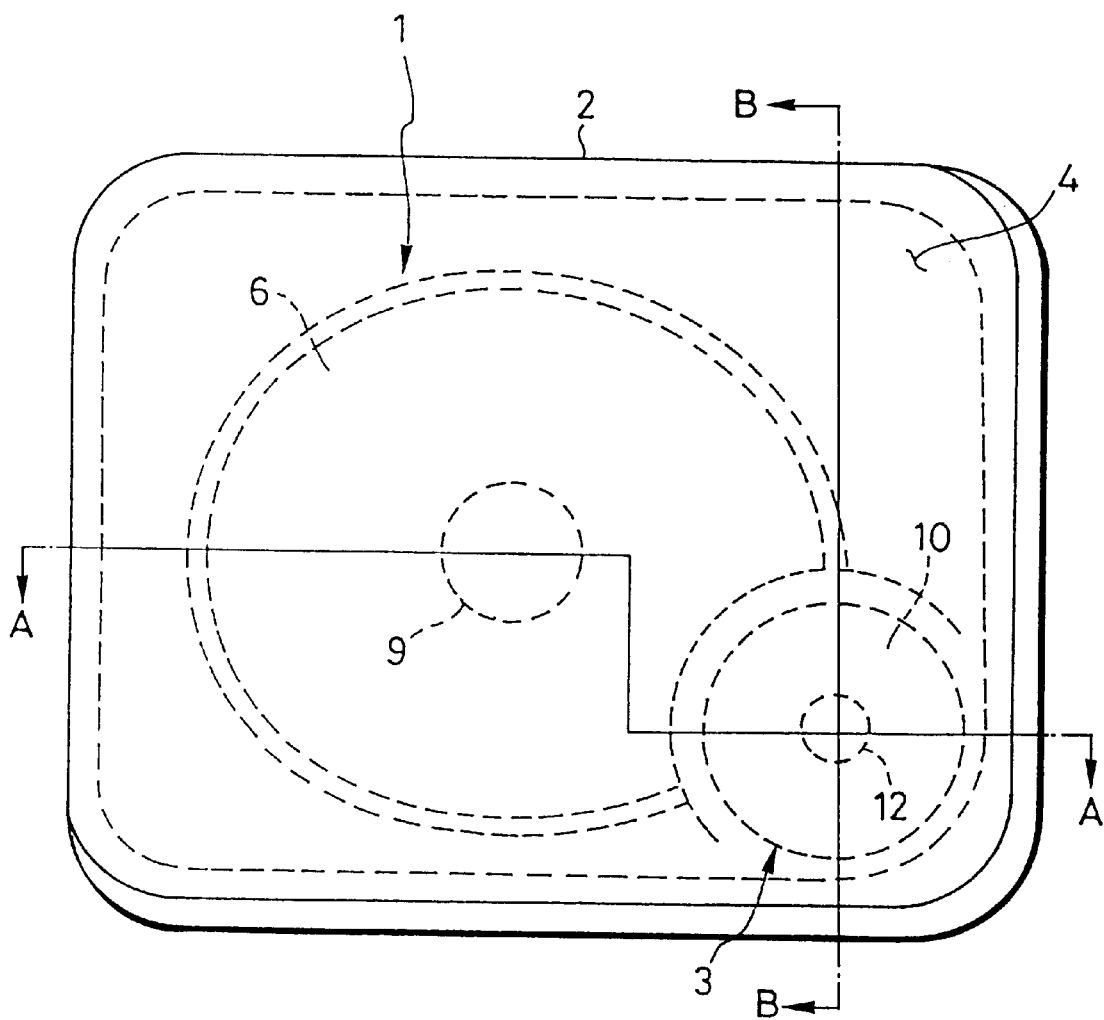
FIG. 1 is a front view showing the overall structure of a combination type vehicle lamp according to the present invention.
Figure 2:
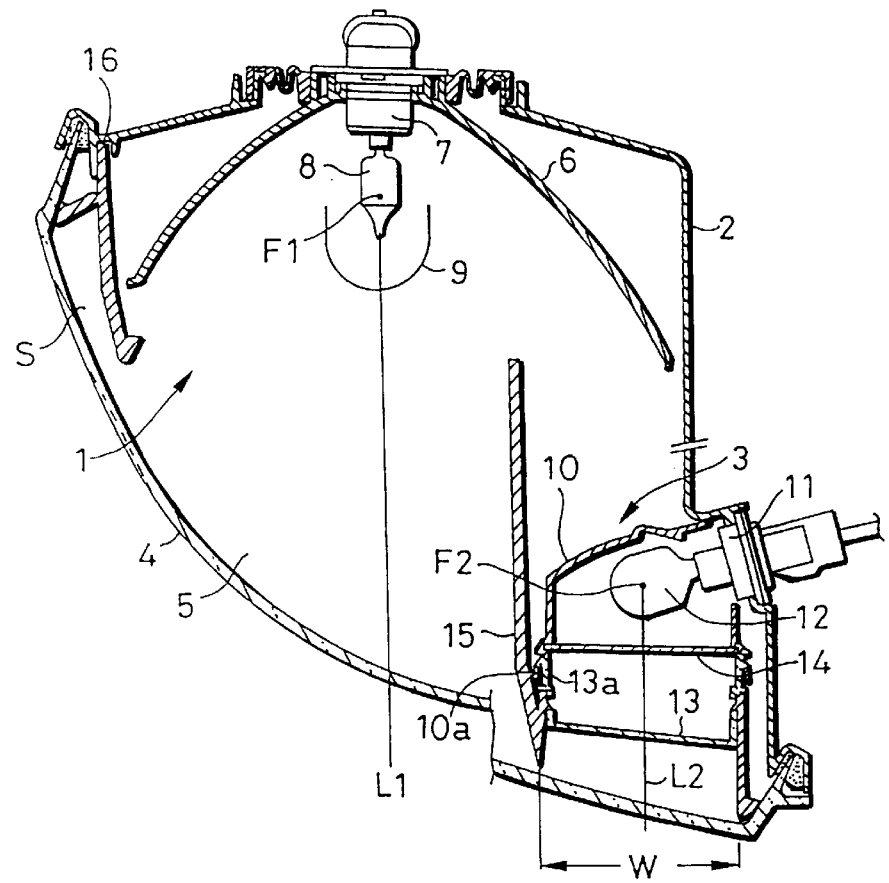
FIG. 2 is a transverse sectional view taken on line —A of FIG. 1.
Figure 3:
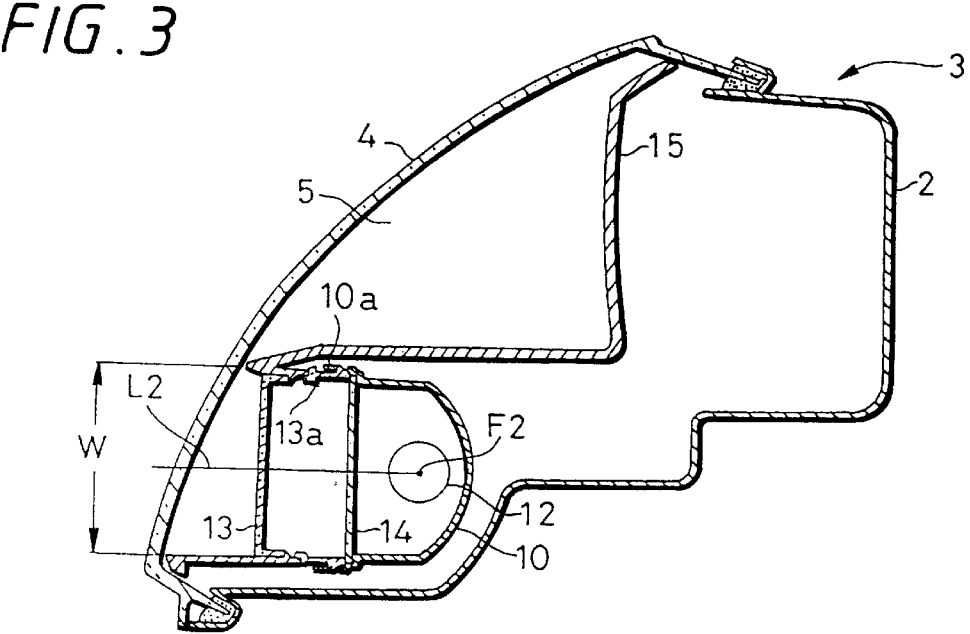
FIG. 3 is a vertical sectional view taken on line B—B of FIG. 1.
Figure 4:
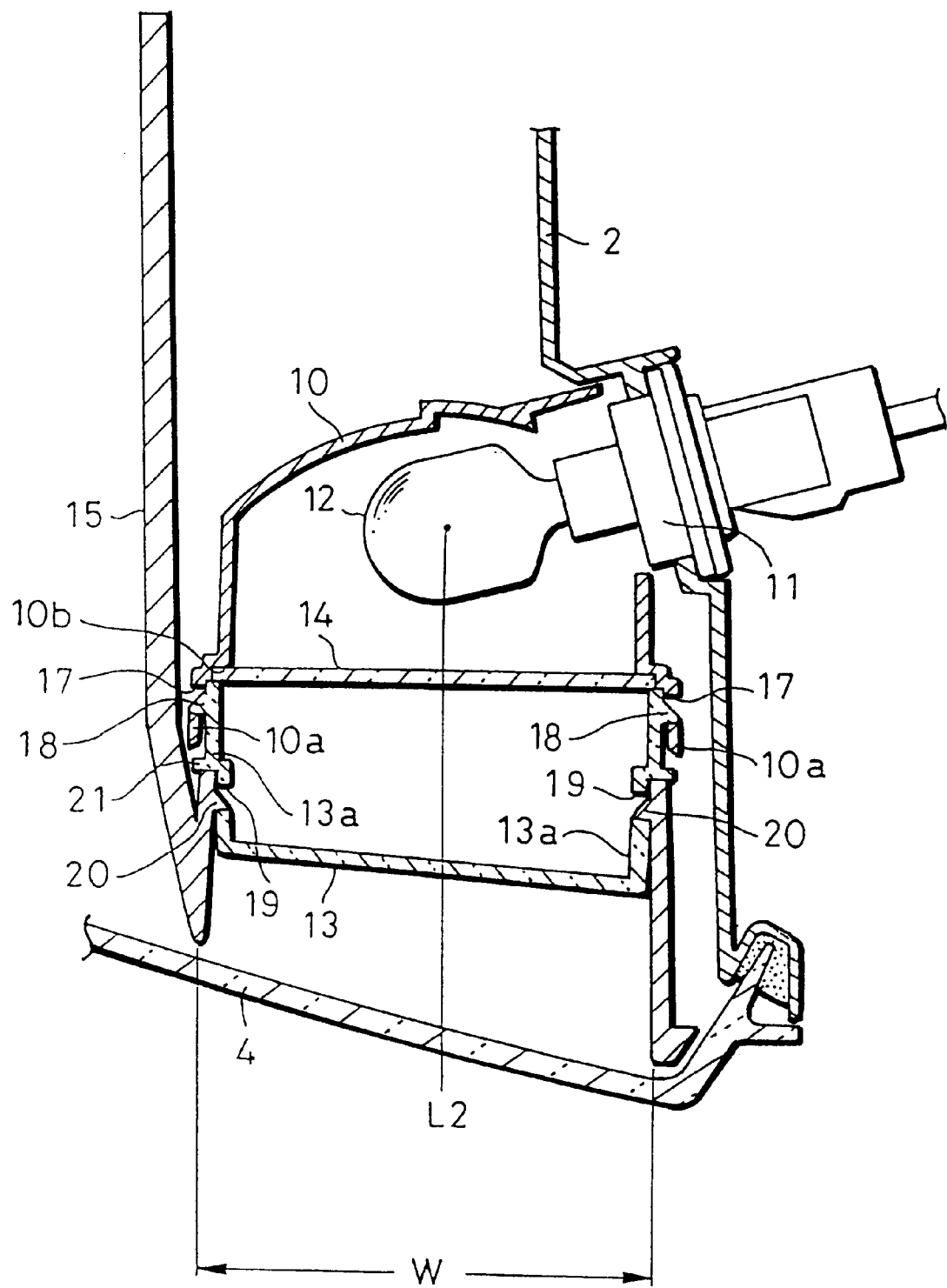
FIG. 4 is an enlarged transverse sectional view showing a vehicle lamp as an auxiliary vehicle lamp.
Figure 5:
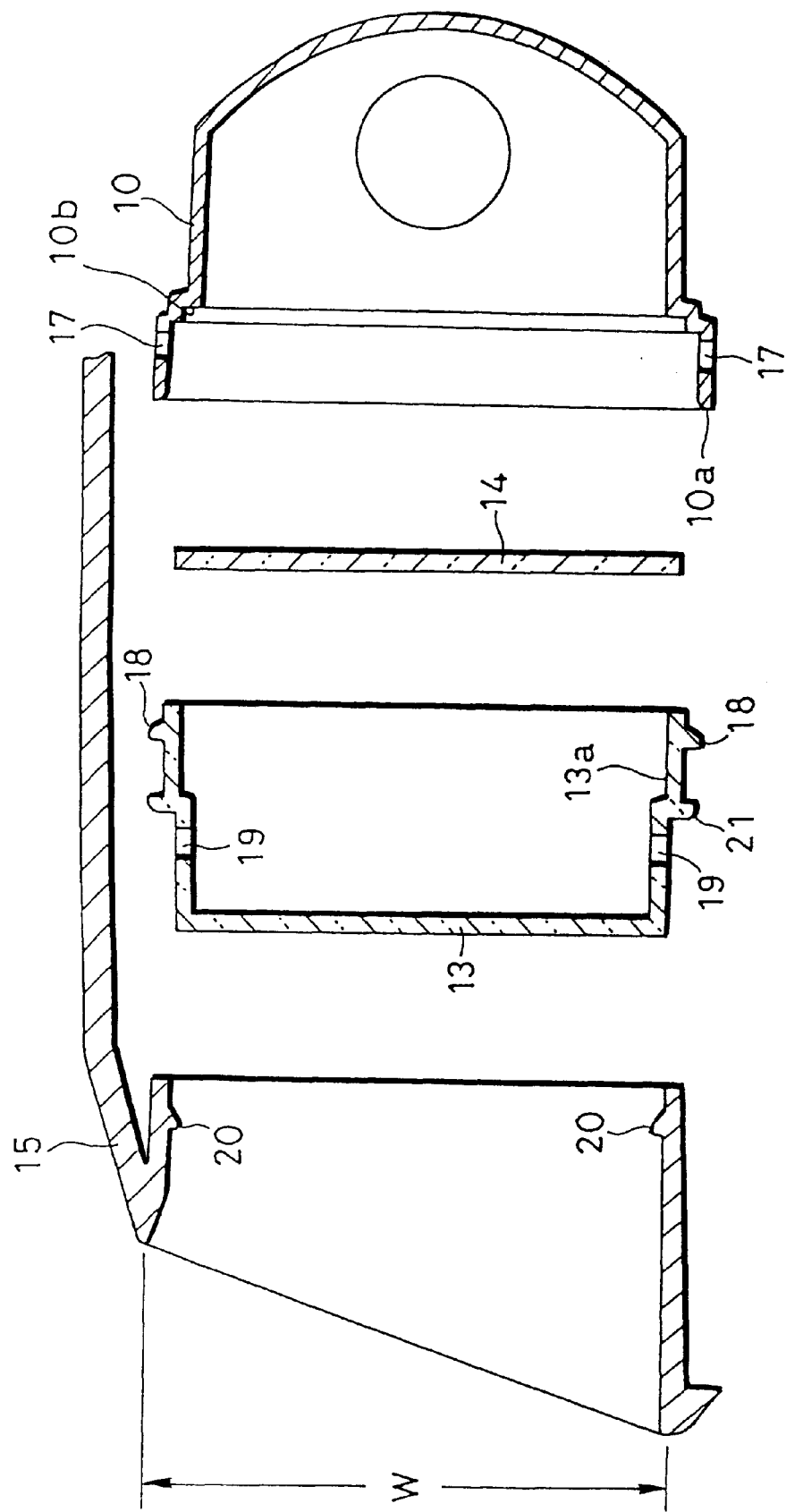
FIG. 5 is an exploded view as viewed from the side of FIG. 4.
Figure 6:
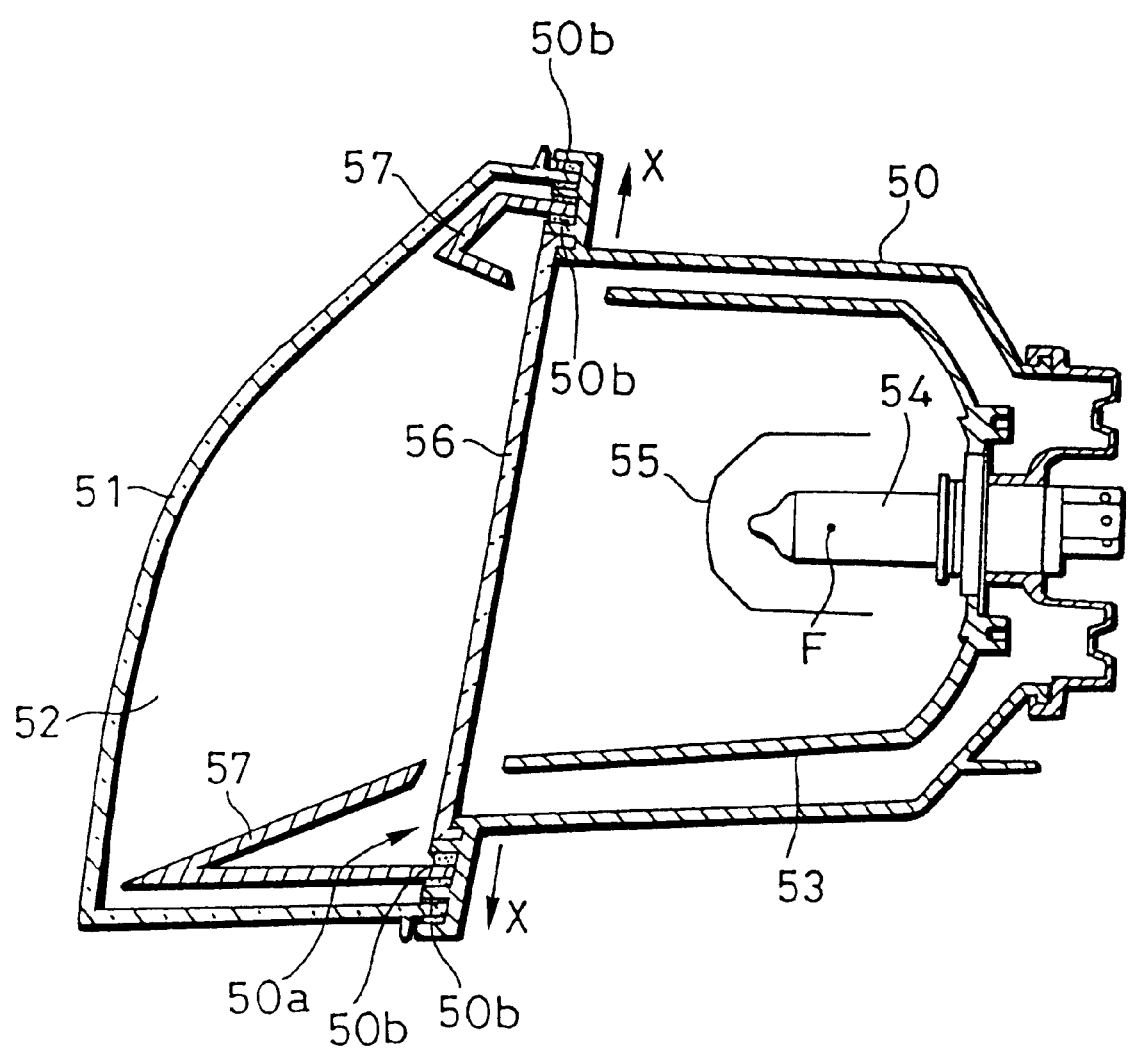
FIG. 6 is a vertical sectional view of a conventional vehicle lamp.

FIG. 1 is a front view showing the overall structure of a combination type vehicle lamp according the an embodiment of the invention, FIG. 2, a transverse sectional view taken on line A—A of FIG. 1, FIG. 3, a vertical sectional view taken on line B—B of FIG. 1, FIG. 4, an enlarged transverse sectional view showing the structure of an vehicle lamp as an auxiliary lamp, and FIG. 5, an exploded view as viewed from the lateral side.

A description will subsequently be given of the structure of a vehicle lamp as a so-called combination type vehicle lamp. More particularly the structure of a vehicle lamp 3 as an auxiliary lamp like a front position lamp formed in a lamp body 2 which is commonly shared by a vehicle lamp 1 as a primary lamp like a head lamp.

In each of the drawings, the vehicle lamp 1 as the primary lamp in this mode for carrying out the invention is provided as a headlamp comprising an outer lens 4 for covering the front opening of a lamp body 2 to define a lamp chamber 5, a reflector 6 movably mounted in the lamp chamber 5 via an illuminating angle adjustment (aiming) mechanism (not shown), a lighting bulb 8 fixedly disposed substantially at a focal point F1 on the optical axis L1 of the reflector 6 via a bulb socket 7, and a shade 9 for covering the front of the bulb 8 in order to shield light emanating upward from the reflector 6.

The outer lens 4 which forms part of the vehicle lamp according to the present invention generally employs so-called a see-through lens without forming a lens step for use in forming a light distribution pattern on the inner surface of the outer lens, so that predetermined light distribution in the lamp unit is made obtainable from the predetermined structure of the reflector 6 and the configuration of the shade 9. In other words, the interior of the lamp chamber 5 is so structured that it can be seen directly through the outer lens 4.

The vehicle lamp 3 which is the auxiliary lamp is formed together with the vehicle lamp 1 as the primary one within the common lamp body 2 of the vehicle lamp, and carries a bulb 12 via a bulb socket 11 substantially at a focal point F2 on the optical axis L2 of a reflector 10 in this mode for carrying out the invention. The bulb socket 11 is slightly tilted forward and fixed in the vehicle lamp as shown in FIG. 2 and the bulb 12 is mounted on the bulb socket 11 fixed on the side of the lamp body 2 in this mode for carrying out the invention. A first inner lens 13 for providing the vehicle lamp 3 as the auxiliary lamp with irradiating light of predetermined color is placed in front of the aforesaid reflector 10 in such a manner as to cover the reflector 10, and a second inner lens 14 is mounted inside the first inner lens 13 between the first inner lens 13 and the bulb 12 as occasion demands.

Since the vehicle lamp according to the present invention is of a combination type in which the vehicle lamp 1 as the primary vehicle lamp and the vehicle lamp 3 as the auxiliary one are mounted in the common lamp body 2, an extension 15 for simultaneous use as a partition plate between the vehicle lamps 1, 3 is mounted in the lamp body 2. The extension 15 is intended to fill up a gap S in the outer peripheral portion with respect to the inner surface of the lamp body 2 of the reflector 6 on the side of vehicle lamp 1 as the primary vehicle lamp movably mount in the lamp chamber 5 and to improve the design property of the lamp chamber 5. The extension 15 is secured by an adhesive 16 to the inner side of the front opening of the lamp body 2 or otherwise fixedly bolted (not shown) thereto, with its surface side planished as viewed from the outside of the vehicle lamp according to the present invention.

In the vehicle lamp according to the present invention, two of the vehicle lamps, namely, the vehicle lamp 1 as the primary vehicle lamp and the vehicle lamp 3 as the auxiliary vehicle lamp are installed simultaneously in the common lamp body 2 and the extension 15 is used for preventing light distribution on both sides from interfering with each other, the vehicle lamp 3 being so structured as to be fixed to the extension 15. In other words, the vehicle lamp 3 as the auxiliary vehicle lamp can be fixed with one touch without using a special adhesive or a fixing tool since the extension 15 is used to fill up the gap S in the outer peripheral portion of the reflector 6 formed on the vehicle lamp 1 as the primary vehicle lamp on one hand and simultaneously used to fix the reflector 10 of the vehicle lamp 3 as the auxiliary vehicle lamp with one touch on the other.

More specifically, the reflector 10 used to form the vehicle lamp 3 as the auxiliary vehicle lamp has a cylindrical portion 10a extending with respect to the inner surface of the reflector 10 with a slight difference in level 10b formed in the outer peripheral direction of the front opening of the reflector 10 and a plurality of mating holes 17 are bored in the peripheral direction of the cylindrical portion 10b. The first inner lens 13 for covering the front opening of the reflector 10 is equipped with a cylindrical portion 13a extending backward and mating projections 18 fitting into the respective mating holes 17 bored on the side of the cylindrical portion 10a of the reflector 10 are projected outward from the lower end of the cylindrical portion 13a. Further, a plurality of mating holes 19 are bored along the circumferential direction of the cylindrical surface in the upper end portion of the first inner lens 13, and mating projections 20 fitting into the respective mating holes 19 project inward on the side of the extension 15.

Each mating hole 17 on the side of the reflector 10 and each mating projection 18 on the side of the first inner lens 13 are fitted together in such a manner that the mating projection 18 on the side of the first inner lens 13 is fitted in from the inside of the cylindrical portion 10a of the reflector 10. On the other hand, each mating hole 19 on the side of the first inner lens 13 and each mating projection 20 on the side of the extension 15 are fitted together in such a manner that the mating projection 20 on the side of the extension 15 is fitted in from the outside of the cylindrical portion 13a of the first inner lens 13.

Therefore, the mating holes 17 on the side of the reflector 10 and the mating projections 18 on the side of the first inner lens 13, and the mating holes 19 on the side of the first inner lens 13 and the mating projections 20 on the side of the extension 15 are each distributed alternatively, internally and externally, whereby even when the first inner lens 13 and the reflector 10 are successively fitted together with one touch with respect to the extension 15, outside lines are formed so as to arrange the outside lines in a straight line on the same cylindrical diameter without allowing the engaging portions to successively stick out outward and to necessarily increase the width of the front opening of the reflector 10. That is, special space width necessary for the provision of the vehicle lamp as the auxiliary vehicle lamp within the lamp body 2 can be minimized to a width W. In other words, the engaging portion of the first inner lens 13 and the extension 15 and that of the first inner lens 13 and the reflector 10 are arranged substantially on the same straight line when viewed from the front of the vehicle lamp 3 as the auxiliary vehicle lamp and the front of the optical axis L2 of the bulb 12.

The second inner lens 14 may be provided in the front opening of the reflector 10 as the occasion demands and by fitting the second inner lens 14 into the stepped portion 10a formed in the front opening of the reflector 10, its outer peripheral portion on the surface side can be pressed down by means of the lower end portion of the first inner lens 13 to fix the outer peripheral portion. Further, a flange 21 projecting outward is formed in the outer peripheral portion of the first inner lens 13 where the mating holes 19 are formed, the flange being formed slightly apart from the portion where the mating holes 19 are provided.

It has also been arranged that the mated portion of the first inner lens 13 and the extension 15 is prevented from backlashing by clamping and fitting the mating projections 20 on the side of the extension 15 in between the flange 21 and the end edges of the mating holes 19, respectively. Therefore, the vehicle lamp 3 as the auxiliary vehicle lamp can be fixed in the lamp chamber 5 with one touch by fitting the mating projections 20 of the extension 15 into the respective mating holes 19 of the first inner lens 13 in such a state that the first inner lens 13 is juxtaposed with the front opening of the reflector 10 in the vehicle lamp 3 as the auxiliary vehicle lamp and besides the second inner lens 14 is juxtaposed with the front opening of the reflector 10 as the need arises.

The vehicle lamp in this mode for carrying out the invention is of the combination type having the vehicle lamp 1 as the primary vehicle lamp and the vehicle lamp 3 as the auxiliary vehicle lamp and though a description has been given of the structure on the side of the vehicle lamp 3 as the auxiliary vehicle lamp, the structure of the vehicle lamp according to the present invention is not necessarily limited to that of the combination type vehicle lamp but may needless to say be that of a single vehicle lamp.

Since the vehicle lamp as the auxiliary vehicle lamp is thus structured in the vehicle lamp according to the present invention, the first and second inner lenses can be fitted to the extension and further the reflector fixed to the first inner lens can be fixedly formed in the lamp body by means of the mating holes and the mating projections. Thus, not only excellent assembling workability but also excellent design property is offered without using adhesives or fixing tools with the particular effect of reducing the number of component parts required as attested by the embodiment of the invention.

What is claimed is:

1. A vehicle lamp comprising:
   a lamp body having a front opening;
   an outer lens coupled to said front opening of said lamp body;
   a lamp chamber defined by said lamp body and said outer lens;
   a reflector having an opening disposed within said lamp chamber;
   a light bulb mounted on said reflector;
   an extension disposed on a periphery of said opening of said reflector, said extension being fixed to one of said lamp body and said outer lens; and
   at least one inner lens disposed within said lamp chamber for covering said opening of said reflector, said inner lens being fixed to said extension.

2. A vehicle lamp according to claim 1, wherein said inner lens is fixed to said periphery of said opening of said reflector.

3. A vehicle lamp as claimed in claim 1, wherein said extension, said inner lens, and said reflector are fixed to each other by engagement between mating holes and mating projections.

4. A vehicle lamp as claimed in claim 2, wherein said extension, said inner lens, and said reflector are fixed to each other by engagement between mating holes and mating projections.

5. A vehicle lamp as claimed in claim 3, wherein a portion where said extension and said inner lens are mated and a portion where said inner lens and said reflector are mated are substantially aligned when viewed from a front of an optical axis of said light bulb.

6. A vehicle lamp as claimed in claim 4, wherein a portion where said extension and said inner lens are mated and a portion where said inner lens and said reflector are mated are substantially aligned when viewed from a front of an optical axis of said light bulb.

7. A vehicle lamp as claimed in claim 1, wherein said inner lens comprises a first inner lens and a second inner lens, said second inner lens is clamped between a rear end edge of said first inner lens and an edge of said opening of said reflector.

8. A vehicle lamp as claimed in claim 2, wherein said inner lens comprises a first inner lens and a second inner lens, said second inner lens is clamped between a rear end edge of said first inner lens and an edge of said opening of said reflector.

9. A vehicle lamp as claimed in claim 3, wherein said inner lens comprises a first inner lens and a second inner lens, said second inner lens is clamped between a rear end edge of said first inner lens and an edge of said opening of said reflector.

10. A vehicle lamp as claimed in claim 4, wherein said inner lens comprises a first inner lens and a second inner lens, said second inner lens is clamped between a rear end edge of said first inner lens and an edge of said opening of said reflector.

11. A vehicle lamp as claimed in claim 5, wherein said inner lens comprises a first inner lens and a second inner lens, said second inner lens is clamped between a rear end edge of said first inner lens and an edge of said opening of said reflector.

12. A vehicle lamp as claimed in claim 6, wherein said inner lens comprises a first inner lens and a second inner lens, said second inner lens is clamped between a rear end edge of said first inner lens and an edge of said opening of said reflector.

* * * * *